US007867594B2

(12) United States Patent
Jennings et al.

(10) Patent No.: US 7,867,594 B2
(45) Date of Patent: Jan. 11, 2011

(54) ENDLESS BELT FOR USE IN DIGITAL IMAGING SYSTEMS

(75) Inventors: Jeff Jennings, Hendersonville, NC (US); Will Goss, Arden, NC (US); Chris Tice, Candler, NC (US)

(73) Assignee: Day International, Inc., Dayton, OH (US)

( * ) Notice: Subject to any disclaimer, the term of this patent is extended or adjusted under 35 U.S.C. 154(b) by 202 days.

(21) Appl. No.: 12/169,726

(22) Filed: Jul. 9, 2008

(65) Prior Publication Data

US 2010/0009585 A1 Jan. 14, 2010

(51) Int. Cl.
*B32B 3/00* (2006.01)
*B32B 27/04* (2006.01)

(52) U.S. Cl. .......................... 428/61; 428/57; 428/121; 428/192; 442/110; 442/117; 442/181; 442/182; 442/183; 442/328; 442/394

(58) Field of Classification Search ................ 442/110, 442/117, 181, 182, 183, 328, 394; 428/57, 428/61, 121, 192
See application file for complete search history.

(56) References Cited

U.S. PATENT DOCUMENTS

| | | | |
|---|---|---|---|
| 5,328,790 | A | 7/1994 | Asano et al. |
| 5,521,037 | A | 5/1996 | Nagase et al. |
| 5,525,446 | A | 6/1996 | Sypula et al. |
| 5,576,818 | A | 11/1996 | Badesha et al. |
| 5,802,442 | A | 9/1998 | Konno et al. |
| 5,922,440 | A | 7/1999 | Schlueter, Jr. et al. |
| 5,978,639 | A | 11/1999 | Masuda et al. |
| 6,044,243 | A | 3/2000 | Hara |
| 6,066,400 | A | 5/2000 | Law et al. |
| 6,067,430 | A | 5/2000 | Mammino et al. |
| 6,201,945 | B1 | 3/2001 | Schlueter, Jr. et al. |
| 6,217,964 | B1 | 4/2001 | Ndebi et al. |
| 6,228,448 | B1 | 5/2001 | Ndebi et al. |
| 6,278,858 | B1 | 8/2001 | Nakazawa et al. |
| 6,387,465 | B1 | 5/2002 | Yuan et al. |
| 6,393,226 | B1 | 5/2002 | Charlebois et al. |
| 6,397,034 | B1 | 5/2002 | Tarnawskyj et al. |
| 6,500,367 | B2 | 12/2002 | Naus et al. |
| 6,751,367 | B2 | 6/2004 | Kusayanagi et al. |

(Continued)

FOREIGN PATENT DOCUMENTS

| | | |
|---|---|---|
| JP | 6114973 | 4/1994 |

(Continued)

OTHER PUBLICATIONS

International Search Report and Written Opinion dated Jun. 10, 2009 pertaining to International application No. PCT/US2009/049024.

*Primary Examiner*—Norca L Torres-Velazquez
(74) *Attorney, Agent, or Firm*—Dinsmore & Shohl LLP

(57) ABSTRACT

An endless belt for use in digital imaging systems is provided having edge to edge uniform flatness, and precise circumferential and edge to edge thickness. The layers comprising the belt may be tailored as desired for use in either image recording, image transfer or sheet transport operations. In one embodiment, the belt includes an elastomeric base layer, a reinforcing support layer, and an elastomeric surface ply. The belt is preferably manufactured by building the layers on a workpiece and then curing the layers.

25 Claims, 3 Drawing Sheets

U.S. PATENT DOCUMENTS

| | | | |
|---|---|---|---|
| 6,902,640 | B2 | 6/2005 | Yamaguchi et al. |
| 7,123,868 | B2 | 10/2006 | Schultheis et al. |

FOREIGN PATENT DOCUMENTS

| | | | |
|---|---|---|---|
| JP | 6222686 | | 8/1994 |
| JP | 9329986 | | 12/1997 |
| JP | 10095092 | | 4/1998 |
| JP | 10123852 | | 5/1998 |
| JP | 10123853 | | 5/1998 |
| JP | 10186875 | | 7/1998 |
| JP | 10268667 | | 10/1998 |
| JP | 11024425 | | 1/1999 |
| WO | 0050960 | A1 | 8/2000 |
| WO | 0050961 | A1 | 8/2000 |

ENDLESS BELT FOR USE IN DIGITAL IMAGING SYSTEMS

BACKGROUND OF THE INVENTION

The present invention is directed to an endless belt and method of making it for use in digital imaging systems, and more particularly, to such a seamless, reinforced belt which may be used in intermediate image transfer, toner fusing or transfusing, and/or sheet transport operations.

Digital imaging systems are widely used in the fields of xerography and electrography where dry or liquid toner is used to print text and graphic images. For example, systems which use digitally addressable writing heads to form latent images include laser, light-emitting diode, and electron beam printers. Copiers use optical means to form latent images. Regardless of how they are formed, the latent images are inked (or toned), transferred and fixed to a paper or polymer substrate. Such systems typically include a component such as an endless belt, roll or drum which is utilized for latent image recording, intermediate image transfer (transfer of a toner image to the belt followed by transfer to a substrate), transfusing of toner (transport of the unfused image onto the belt with subsequent fusing), contact fusing, or electrostatic and/or frictional transport of imaging substrates such as paper, transparencies, etc.

In the case of endless belts, such belts are typically moved or driven under appropriate traction and tension by rotating cylindrical rollers. As such belts play a critical role in the imaging or substrate transport process, they must be engineered to meet exacting standards. For example, image transfer belts must be seamless, flexible, and must exhibit uniform flatness. Further, the belts should provide certain electrical properties (dielectric constant, volume and surface resistivity, etc.) chemical properties (resistance to humidity, UV light, etc.) and dimensional specifications (circumference, thickness, width, etc.) which may vary depending on the desired application.

If the belts include nonuniformities as manufactured or in operation, various problems arise. For example, where the belts are used for latent image recording, surface flatness is of critical importance as the surface of the belt may be electrostatically charged using high resolution laser beams positioned over the belt. If the belt is not uniformly flat, image quality may suffer due to randomly localized deformation.

Accordingly, there is still a need in the art for an endless belt for use in digital imaging systems which can be manufactured and operated to be within exacting tolerances, including surface flatness, and which may be used for a wide variety of imaging, image transfer or sheet transport operations.

BRIEF SUMMARY OF THE INVENTION

The present invention meets that need by providing an endless belt having precise and uniform flatness which also possesses a working surface which can be tailored to provide the proper characteristics for image transfer or sheet transport. By uniform flatness, it is meant that the thickness of the belt varies less than 0.001 inches (0.003 cm) from edge to edge and also from one circumferential point (location) to another. The circumferential uniformity of the belt also varies less than 0.005 inches (0.013 cm) circumferentially in conicity to provide circumferential uniformity over the entire belt structure.

In accordance with one aspect of the present invention, an endless belt for use in a digital imaging system can be provided which can have first and second edges and a plurality of layers. In one embodiment, the belt can include an elastomeric base ply, a reinforcing support layer on the elastomeric base layer, and an outer elastomeric layer having a working surface on the support layer. The support layer may also be impregnated with a polymeric or elastomeric material which may provide electrical and/or thermal conductivity properties to the belt. In another embodiment, the support layer can be the base layer and at least one elastometic ply can be on the support layer. In another embodiment, the support layer can be on at least one elastomeric ply. The support layer can be used as the working surface. It should be understood that for purposes of the present invention, the term "on" when referring to the position of the layers means that one layer is adjacent to and in contact with the layer that it is "on". Further, it should be understood that for purposes of the present invention, the terms "ply" and "layer" are interchangeable.

In one embodiment, the outer elastomeric layer can function as a working surface layer which can be adapted to accept an imaging composition or to transport a substrate. In another embodiment, the reinforcing support layer can function as a working surface layer. For example, the surface layer may be used as an intermediate image transfer surface which accepts a toned and unfused image from an image recording component; as a dielectric surface which accepts electrostatic surface charge density for attracting, holding in register, and transporting paper or transparency substrates; or as a toner fusing surface which can press and fix (or fuse) toner to a substrate.

The elastomeric base layer and outer layer can be preferably selected from the group consisting of silicone, fluorosilicone, fluorocarbon, EPDM (ethylene-propylene diene terpolymers), EPM (ethylene-propylene copolymers), NBR (nitrile-butadiene rubber), ECO (epiclorohydrin rubber), polyurethane elastomers, and blends thereof. In embodiment where the support layer includes woven or non-woven reinforcing material, an elastomer may be used to impregnate the fabric layer partially or completely. Such elastomer may also comprise any of the above elastomers.

In one embodiment of the invention, the outer elastomeric layer can be electrically conductive. By electrically conductive, it is meant that the outer elastomeric layer preferably has a surface resistivity of less than about $10^{14}$ ohm/square which is desirable for intermediate image transfer, toner fusing or transfusing applications.

In applications such as substrate transport in which a surface charge density can be applied to the working surface layer, the outer elastomeric layer or entire endless belt preferably can have a volume resistivity of greater than about $10^{12}$ ohm·cm.

In another embodiment of the invention, the outer layer can be electrically insulative. By electrically insulative, it is meant that the layer has a volume resistivity of greater than about $10^{14}$ ohm·cm. The surface resistivity of the outer layer can be about $10^{14}$ ohm/square or greater, which is desirable for electrostatic applications which involve gripless substrate transport over the belt surface.

The reinforcing support layer preferably can comprise a woven or non-woven fabric. The support layer can be preferably etched on both major surfaces so as to achieve good adhesion with the base and outer elastomeric layers. The woven and non-woven fabric can be comprised of electrically and thermally conductive and/or non-conductive materials such as, for example, high temperature resistant aramid fibers, nylons, polyester, cotton, carbon fiber, Nomex, fiberglass, various metal and metal-coated fibers and polyphenylenebenzobisoxazole (PBO).

In another embodiment, a method of making the endless belt is provided and generally can comprise the steps of applying an uncured elastomer to a workpiece such as a mandrel to form a base layer. The elastomer may be coated onto the surface of the workpiece in the form of a solvated rubber or cement or it may be applied in the form of a calendared or extruded formable sheet. Next, a reinforcing support layer can be applied over the base layer for latitudinal and circumferential reinforcement. The reinforcing support layer can be oriented in the machine direction. The lengthwise ends of the support layer can be tapered in thickness, weight and/or density to ensure uniformity and seamlessness within the belt circumference. An uncured elastomer layer can then be applied over the reinforcing support layer to form an outer layer. The outer elastomer layer may be applied by coating it in the form of a solvated rubber or it may be applied in the form of a calendered or extruded formable sheet.

After the outer elastomeric layer is applied, the assembled layers can then be cured. After curing, the surface of the outer elastomeric layer can be preferably ground or otherwise treated to achieve uniform flatness such that the elastomeric layer functions as a working surface layer as described above.

The resulting belt does not require a spun-cord reinforcing layer to satisfy desired dimensional stability requirements. The benefits offered by this belt can include the ability to produce very thin belts without fear of potential cord showthrough in the print. Further benefits of a cord-free construction can be faster and easier production.

Endless belts formed in accordance with embodiments of the present invention have been found to exhibit excellent performance when installed under tension in digital imaging machines. Based on the construction and choice of elastomer, the belts have also been found to exhibit acceptable toner acceptance properties for use in intermediate image transfer, adequate retention of surface charge density for substrate transport applications, and/or good toner release properties for fusing or transfusing applications.

Accordingly, it is a feature of embodiments of the present invention to provide a seamless belt for use in digital imaging machines which exhibits uniform flatness, and which can be used for latent image recording, intermediate image transfer, substrate transport, toner fusing or toner transfusing. These, and other features and advantages of the present invention will become apparent from the following detailed description, the accompanying drawings, and the appended claims.

BRIEF DESCRIPTION OF THE SEVERAL VIEWS OF THE DRAWINGS

The following detailed description of specific embodiments of the present invention can be best understood when read in conjunction with the following drawings, where like structure is indicated with like reference numerals and in which.

DETAILED DESCRIPTION

In the following detailed description of the several embodiments, reference is made to the accompanying drawings that form a part hereof, and in which are shown by way of illustration, and not by way of limitation, specific embodiments in which the invention may be practiced. It is to be understood that other embodiments may be utilized and that logical, mechanical and electrical changes may be made without departing from the spirit and scope of the present invention.

The seamless belt can provide an advantage over prior art belts in that the seamless belt may be manufactured within exacting tolerances to obtain uniform flatness and superior performance under rotational tension. In addition, the plies may be varied and, if necessary, interchanged for specific applications such that the belt can be tailored for use in latent image recording, intermediate image transfer, substrate transport, and toner fusing or toner transfusing. By eliminating the use of spun cord reinforcement, the belt thickness can be less than prior art belts while providing improved image quality.

For example, in substrate transport applications in which a surface charge density is applied over the outer layer, the outer working surface or the entire endless belt can have a back to face bulk resistivity of about $10^9$ ohm·cm or higher. For intermediate image transfer, the outer working surface can comprise an elastomer such as, for example, silicone, fluorocarbon, or fluorosilicone, that can be capable of releasing toner and can have a surface resistivity of less than about $10^{14}$ ohm/square. For toner fusing, all of the layers in the belt can be comprised of high temperature resistant and thermal transfer efficient elastomers such as silicone or fluorocarbon. For transfusing applications, the outer working surface can be comprised of a high temperature resistant elastomer that can have adequate toner release properties and a surface resistivity of less than about $10^{14}$ ohm/square.

Figure 1:
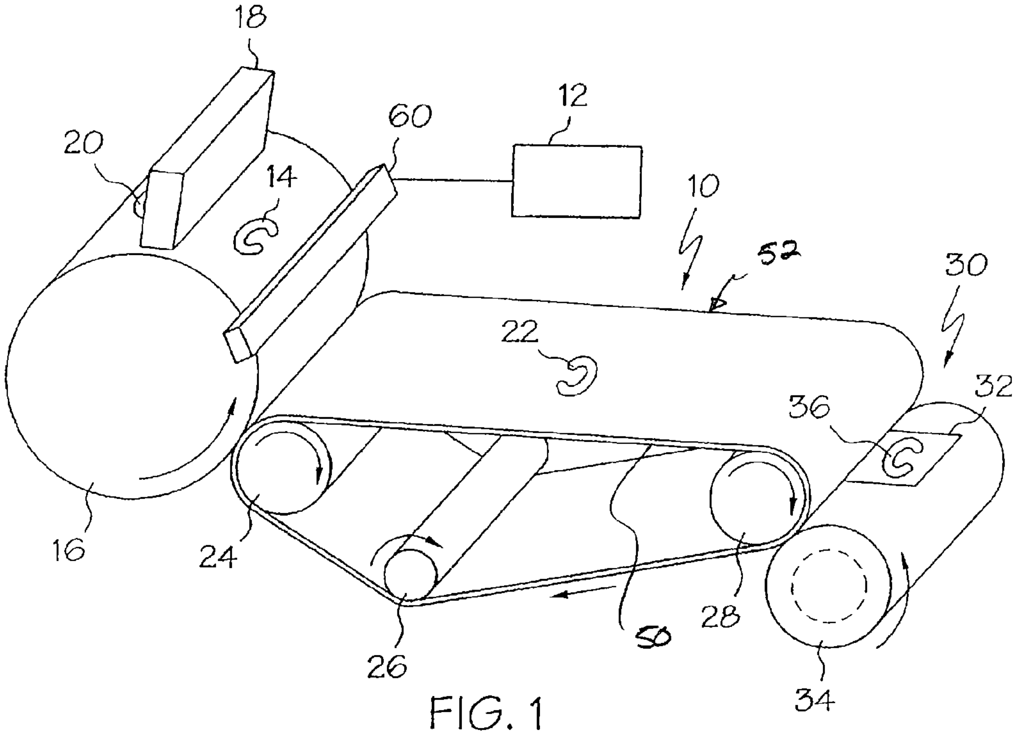
FIG. 1 is a perspective view of one embodiment of the belt of the present invention mounted on rotational rollers.
Figure 2:
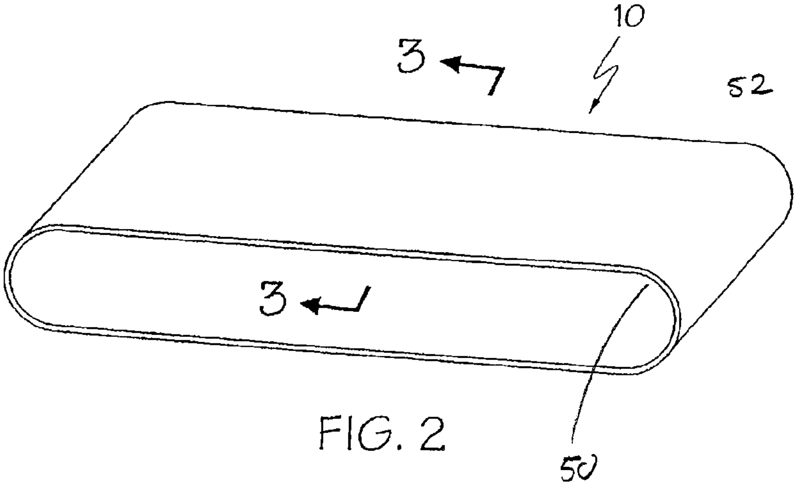
FIG. 2 is a perspective view of the belt of FIG. 1 according to an embodiment of the present invention.

Referring now to FIGS. 1 and 2, a belt 10 made according to the present invention is illustrated which has a seamless, uniformly flat structure. The belt 10 can have a first edge 50 and a second edge 52. In the embodiment shown in FIG. 1, the belt 10 can be used for intermediate image transfer. In other applications, the belt may be used on a recording drum such as the recording drum 16 shown in FIG. 1. Initially, a computer 12 can control the formation of a latent image 14 via a writing head 60 (such as a laser or LED, for example) onto a recording drum 16. The latent image electrostatically can attract dry toner from a toner cartridge 18 to form a toned, unfused image 20. This image can then be transferred to the belt 10 in the form of an intermediate image 22. The belt may be driven by rollers 24, 26 and 28 which advance the intermediate image through a transfusing nip 30 where heat and pressure can be applied to simultaneously transfer and fuse the toner image onto a substrate 32 which can be synchronously and frictionally advanced by fusing roller 34 and belt 10 to form the final, fused image 36. It should be appreciated that latent image 14, unfused image 20, intermediate image 22 and fused image 36 are shown in such a way as to better illustrate the sequence of steps involved in forming an image. For example, in the actual process, transfer and fusing of image 36 onto substrate 32 can actually occurs at nip 30. The above-described process can also be adapted for use with liquid toner.

Figure 3:
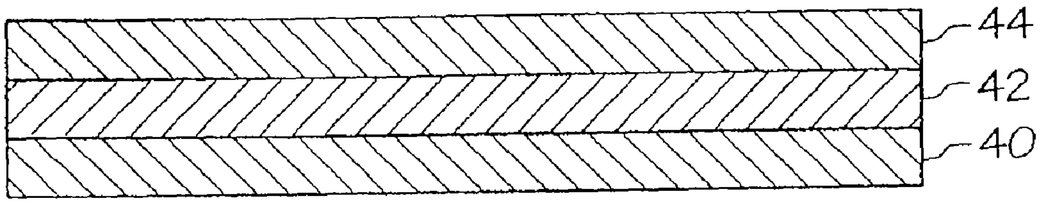
FIG. 3 is a sectional view taken along lines 3-3 of FIG. 2 according to an embodiment of the present invention.

FIG. 3 illustrates the endless belt made according to one embodiment of the present invention. The belt 10 can include an elastomeric base ply 40, a reinforcing support layer 42 on the base ply, and an outer elastomeric layer 44. The elastomeric base ply 40 and outer elastomeric layer 44 may be comprised of silicone, fluorosilicone, fluorocarbon, EPDK, EPM, or urethane. The reinforcing support layer 42 may comprise woven or non-woven fabric which can provide transverse strength as well as latitudinal and circumferential reinforcement to the belt. The reinforcing support layer 42 may also be used to impart electrical and thermal conductivity characteristics to the belt construction. The reinforcing support layer 42 can also be impregnated with any of the above elastomers as will be described below. In one embodiment, the impregnation of the reinforcing support layer 42 may be complete. In another embodiment, the reinforcing support layer 42 can be partially impregnated. In one embodiment, the reinforcing support layer 42 may be provided as a pre-impregnated woven or non-woven fabric. In another embodiment, the impregnation of the support layer 42 may be accomplished as a process step within the belt construction as described below.

The fabric of the reinforcing support layer 42 may comprise electrically and thermally conductive and/or non-conductive materials such as, for example, high temperature resistant aramid fibers, nylons, polyester, cotton, carbon fiber, Nomex, fiberglass, various metal and metal-coated fibers and polyphenylenebenzobisoxazole (PBO). These materials can be selected for electrical and/or thermal conductivity and may or may not be oriented within the support layer 42 structure. Preferably, the fabrics can be oriented in the machine direction and can serve to increase load at failure as well as increase modulus while reducing the necessary amount of fabric for equivalent properties. Machine orientations of 3-4 to 1 are preferable. Additionally, the woven or non-woven fabrics can be calendared prior to use in order to improve gauge uniformity and to reduce loose fiber show-through, thereby reducing the total cross-sectional space required for the fabric. Further, the lengthwise ends of the fabric of the reinforcing support layer 42 can be tapered in thickness, weight or density such that when two tapered ends overlap at a splice, the cumulative thickness, weight or density can maintain uniformity and functional seamlessness within the belt circumference.

Figure 4:
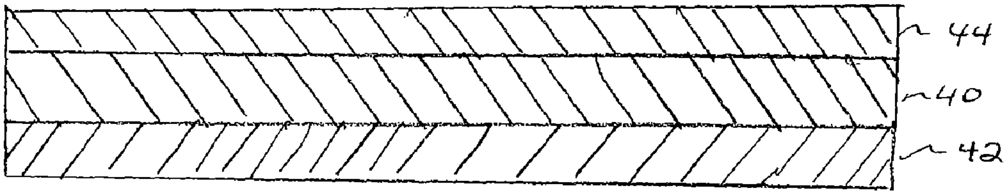
FIG. 4 is a sectional view according to another embodiment of the present invention.
Figure 5:
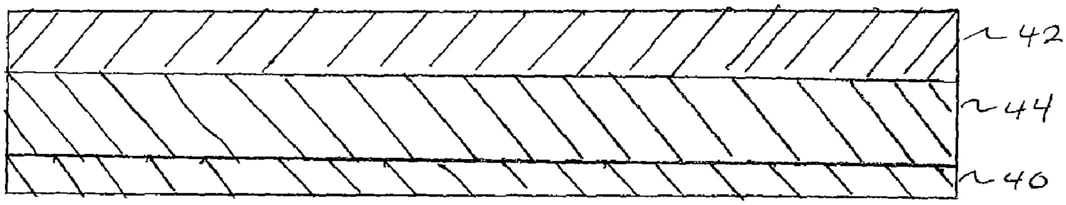
FIG. 5 is a sectional view according to another embodiment of the present invention.

In another embodiment, the seamless belt can be constructed with the reinforcing support layer 42 as the lowermost layer, that is beneath both the elastomeric layers 40, 44, as shown in FIG. 4. In yet another embodiment, the seamless belt can also be constructed with reinforcing support layer 42 as the topmost layer, that is on top of both the elastomeric layers 40, 44 as illustrated in FIG. 5.

Preferably, the elastomeric surface ply can be comprised of a silicone rubber such as polydimethyl siloxane or methylvinyl siloxane based rubber mixed with other ingredients according to the desired specifications. The elastomeric surface ply may be electrically conductive or non-conductive, depending on the desired application of the belt. Where a conductive elastomeric ply is desirable, the elastomer can be preferably doped with a sufficient amount of carbon black or other conductive additives to give the outer ply or entire endless belt a surface resistivity of less than about $10^{14}$ ohm/square. Alternatively, the desired electrical properties may be achieved using conductive polymers, conductive plasticizers, or conductive salts such as, for example, epichlorhydrin, polyaniline, "Vulkanol-KA" (polyglycolether), "Hercoflex-600" (pentaerythritol ester), and chlorides or bromides of iron, copper or lithium.

Figure 6:
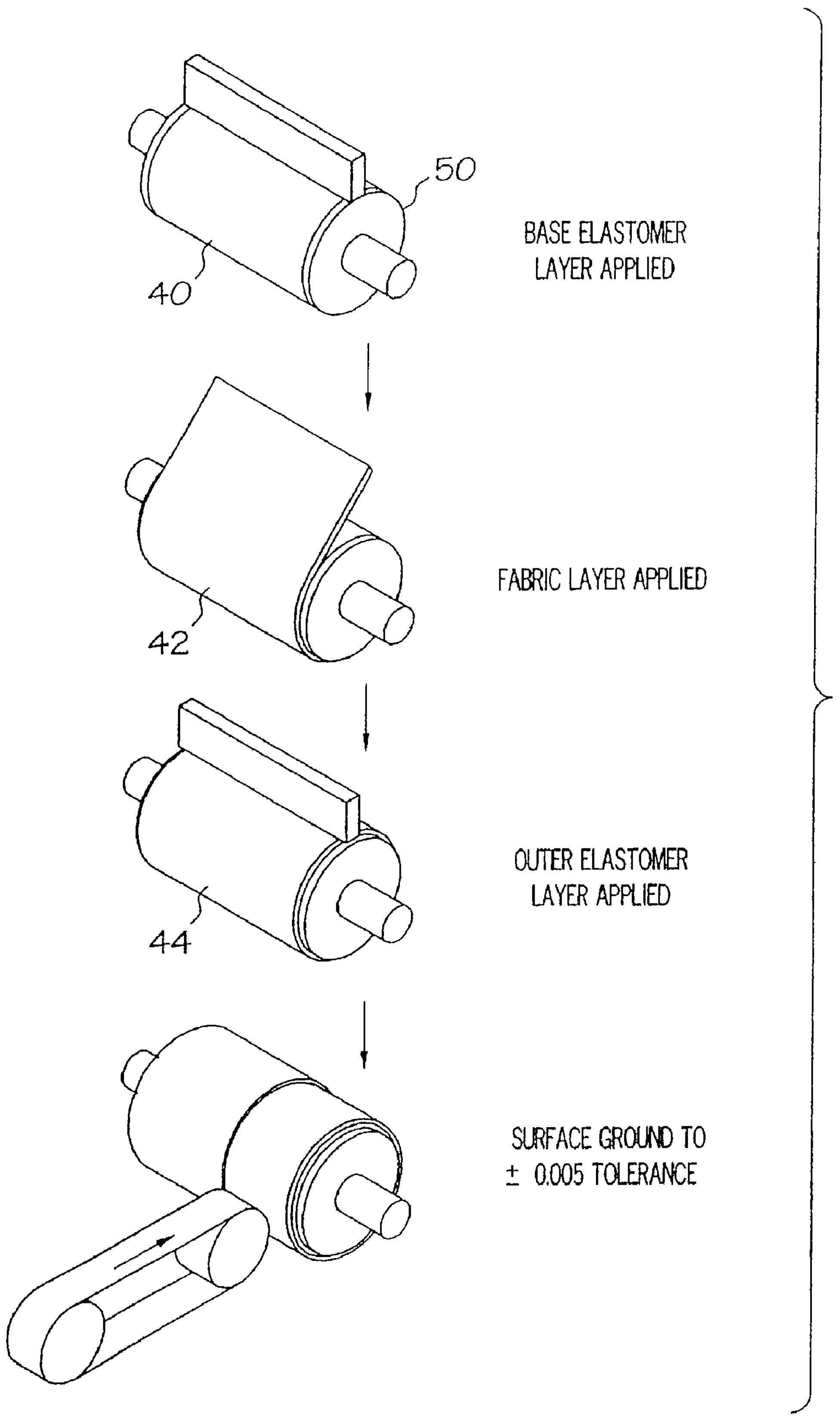
FIG. 6 is a flow diagram illustrating the steps of one method of making the belt of the present invention according to an embodiment of the present invention.

Reference is now made to FIG. 6 which is a flow diagram illustrating the steps in one method of preparing the seamless belt of the present invention. Like reference numbers in FIG. 6 represent the same elements as described in FIGS. 3-5.

In order to achieve precise edge to edge circumferential uniformity, a fixed and highly toleranced workpiece such as a metallic cylinder or cylindrical mandrel 50 with a polished surface may be used to build the belt. In one embodiment, an elastomer provided in a solvent solution can be then applied to the mandrel, either by knife coating or roller coating to form base elastomer layer 40. The base elastomer layer 40 can have a thickness of between about 0.001 to about 0.005 inches.

Next, a woven or non-woven fabric comprising a reinforcing support layer 42 of very thin caliper may be layered over the surface of the base elastomer layer 40. Preferably, the fabric can be dipped in a solvated rubber cement prior to application over the base elastomer layer 40. Examples of suitable commercially-available fabrics include calendared "Kevlar" non-woven from Technical Fibre Products, "Kevlar" non-woven from Dupont, "Kevlar" non-woven from Advanced Fiber Nonwovens (division of Hollingsworth and Vose), Aramid non-woven from Teijin ("Twaran" non-woven), or any other suitable fabric. The fabric can have a thickness of less than about 0.006 to about 0.012 inches.

Finally, a solvated elastomer can be knife-coated to the desired thickness over the reinforcing support layer 42 to form the elastomeric surface layer 44. Alternatively, the surface layer 44 may be built by using calendered and formable sheets of rubber that can be directly applied to the reinforcing support layer 42. Depending on the application, the overall belt can be about 0.010 to over 0.20 inches thick. The elastomeric surface layer 44 can be about 50% to about 75% of the total belt gauge After the belt is built over the cylindrical mandrel, it may be tightly wrapped in a plastic jacket (not shown) and placed under heat and pressure to cure the elastomer rubber in the layers of the belt. Upon curing, the belt can be unwrapped at room temperature and finished according to desired specifications such as Ra, matte or glossy, etc. in order to form a useful working surface. The working surface is preferably ground to a +/−0.0005 inch (0.0013 cm) thickness tolerance.

In applications in which a cast surface is desired, the belt layers may be formed in reverse order from the method illustrated in FIG. 6, e.g., the elastomer layer 44 can be applied first over the metallic cylinder or cylindrical mandrel 50. Next, reinforcing support layer 42 can be applied over layer 44 in the manner described above. An elastomer layer 40 can be applied over reinforcing support layer 42. The assembly can be tightly wrapped and cured. Upon curing, elastomer layer 40 may be ground to a desired gauge. Finally, the belt structure can be inverted such that the cast layer 44 forms the outer working surface layer and the ground layer 40 becomes the base layer.

It is noted that terms like "preferably," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. An endless belt for use in a digital imaging system having first and second edges and a plurality of layers comprising:

an elastomeric base layer;

a support layer on the base layer, wherein the support layer is impregnated with a material to provide electrically and/or thermally conductivity to the endless belt; and an outer elastomeric layer on the support layer, wherein the outer layer forms a seamless working surface layer.

2. An endless belt as claimed in claim 1 in which the support layer is comprised of woven or non-woven reinforcing material.

3. An endless belt as claimed in claim 2 in which the woven or non-woven reinforcing material is calendared before use.

4. An endless belt as claimed in claim 1 in which the support layer is selected from the group consisting of high temperature resistant aramid fibers, nylons, polyester, cotton, carbon fiber, fiberglass, various metal and metal-coated fibers, polyphenylenebenzobisoxazole and combinations thereof.

5. An endless belt as claimed in claim 2, wherein the support layer is oriented in the machine direction.

6. The endless belt of claim 5, wherein the machine orientation is 3 to 1.

7. The endless belt of claim 5, wherein the machine orientation is 4 to 1.

8. The endless belt of claim 1, wherein the lengthwise ends of the support layer are tapered such that where the tapered ends overlap at a splice the uniformity and seamlessness of the endless belt is maintained.

9. The endless belt of claim 1, wherein the lengthwise ends of the support layer are tapered in thickness, weight or density.

10. An endless belt as claimed in claim 1 wherein the thickness of the belt varies less than 0.001 inches (0.003 cm) from the first edge to the second edge and also from one circumferential point (location) to another.

11. An endless belt as claimed in claim 1 wherein the circumferential uniformity of the belt varies less than 0.005 inches (0.013 cm) in conicity.

12. An endless belt as claimed in claim 1 in which the elastomeric base layer and outer layer are selected from the group consisting of silicone, fluorosilicone, fluorocarbon, EPDM (ethylene-propylene diene terpolymers), ethylene-propylene copolymers, polyurethane elastomers, nitrile-butadiene rubber, epichlorohydrin rubber, and blends thereof.

13. An endless belt as claimed in claim 1 in which the support layer is impregnated with an elastomer selected from the group consisting of silicone, fluorosilicone, fluorocarbon, EPDM (ethylene-propylene diene terpolymers), ethylene-propylene copolymers, polyurethane elastomers, nitrile-butadiene rubber, epichlorohydrin rubber, and blends thereof.

14. An endless belt as claimed in claim 1 in which the support layer is substantially completely impregnated with an elastomer.

15. An endless belt as claimed in claim 1 in which the support layer is partially impregnated with an elastomer.

16. An endless belt as claimed in claim 1 in which the outer elastomeric ply is electrically conductive or electrically insulative.

17. An endless belt as claimed in claim 1 in which the belt has a volume resistivity of greater than about $10^9$ ohm·cm.

18. An endless belt for use in a digital imaging system having first and second edges and a plurality of layers comprising:

an elastomeric base layer;

a support layer on the base layer, wherein the support layer is comprised of woven or non-woven reinforcing material whose orientation is in the machine direction; and an outer elastomeric layer on the support layer, wherein the outer layer forms a seamless working surface layer.

19. The endless belt of claim 18, wherein the support layer is impregnated with a material to provide electrically and/or thermally conductivity to the endless belt.

20. The endless belt of claim 18, wherein the lengthwise ends of the support layer are tapered in thickness, weight or density such that where the tapered ends overlap at a splice the uniformity and seamlessness of the endless belt is maintained.

21. An endless belt for use in a digital imaging system having first and second edges and a plurality of layers comprising:

an elastomeric base layer;

a support layer on the base layer, wherein the lengthwise ends of the support layer are tapered; and an outer elastomeric layer on the support layer, wherein the outer layer forms a seamless working surface layer.

22. The endless belt of claim 21, wherein the support layer is impregnated with a material to provide electrically and/or thermally conductivity to the endless belt.

23. The endless belt of claim 21, wherein the support layer is comprised of woven or non-woven reinforcing material whose orientation is in the machine direction.

24. The endless belt of claim 21, wherein the tapered ends of the support layer are tapered in thickness, weight or density such that where the tapered ends overlap at a splice the uniformity and seamlessness of the endless belt is maintained.

25. An endless belt having a spun-cord free construction for use in a digital imaging system having first and second edges and a plurality of layers comprising:

an elastomeric base layer;

a support layer comprising a woven or non-woven reinforcing material on the base layer, wherein the support layer is impregnated with a material to provide electrically and/or thermally conductivity to the endless belt; and an outer elastomeric layer on the support layer, wherein the outer layer forms a seamless working surface layer; and wherein the thickness of the belt varies less than 0.001 inches (0.003 cm) from the first edge to the second edge and from one circumferential point (location) to another.

* * * * *